Patented June 9, 1936

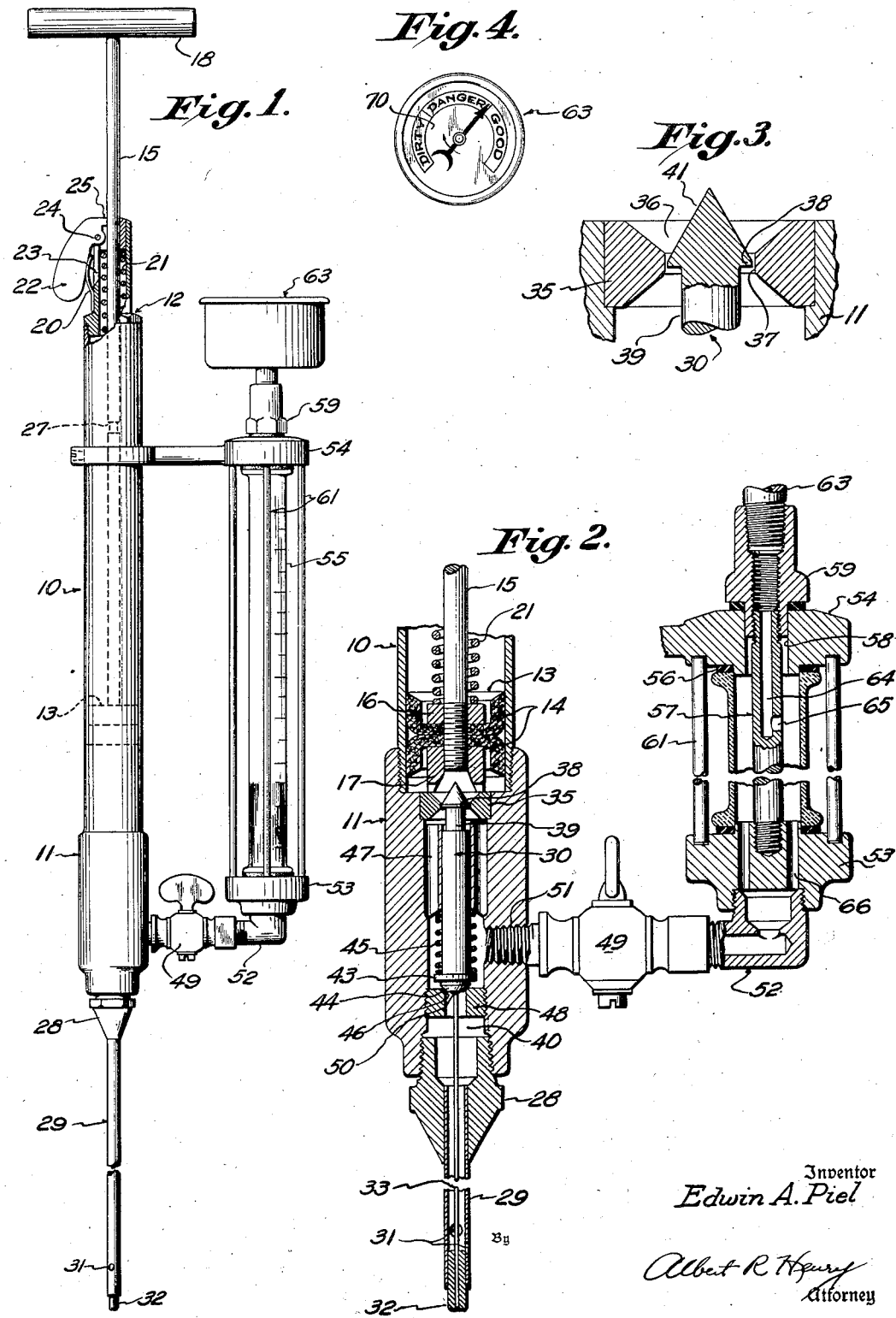
June 9, 1936. E. A. PIEL 2,043,964
DIRT INDICATOR FOR LUBRICATING OIL
Filed Feb. 1, 1934  2 Sheets-Sheet 1
Inventor
Edwin A. Piel
Albert R. Henry
Attorney

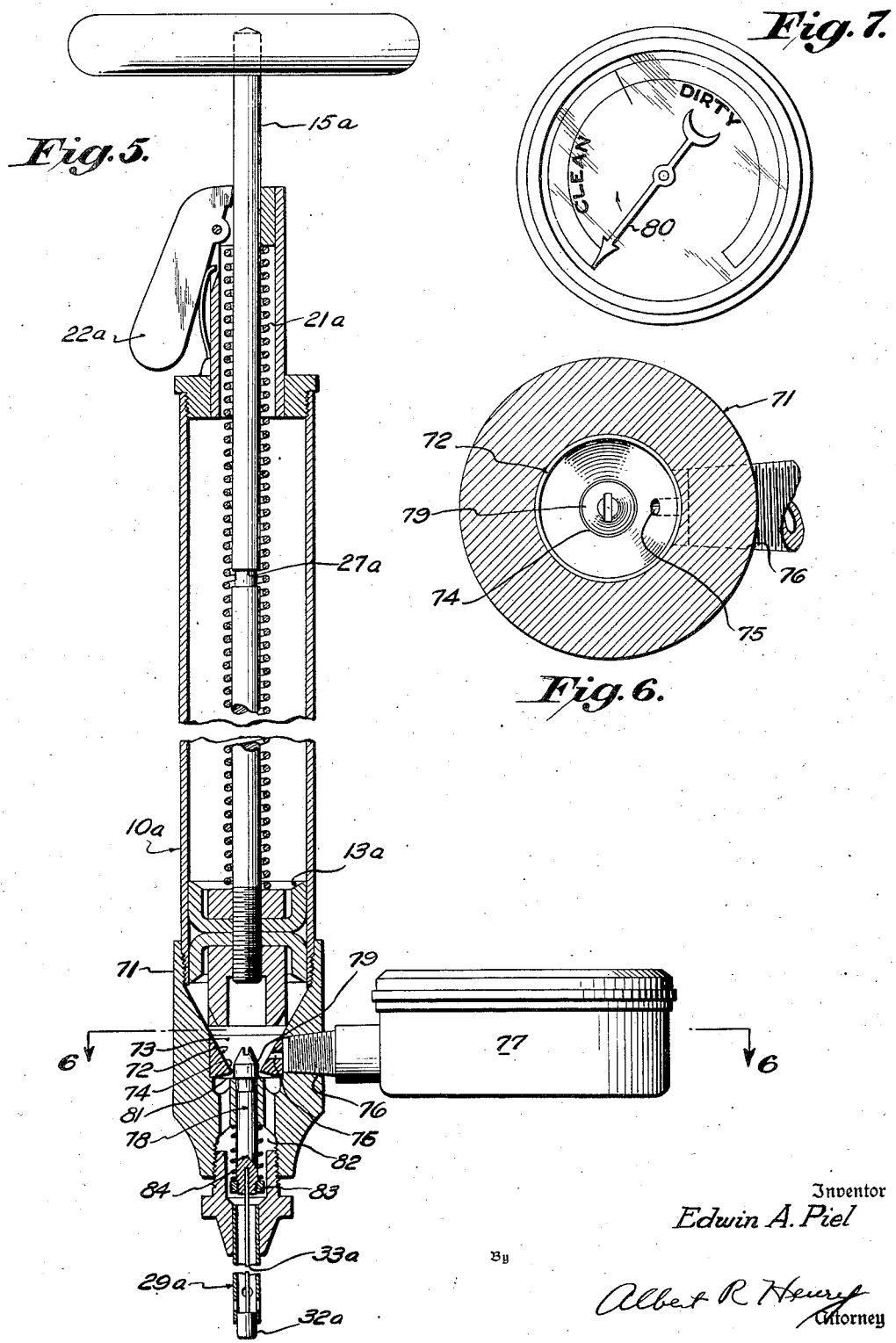

2,043,964

UNITED STATES PATENT OFFICE 2,043,964

DIRT INDICATOR FOR LUBRICATING OIL

Edwin A. Piel, Buffalo, N. Y., assignor to Clardon Corporation, Buffalo, N. Y.

Application February 1, 1934, Serial No. 709,362

11 Claims. (Cl. 73—51)

This invention relates to apparatus for determining the dirt content of liquids such as lubricating oil, and it has particular reference to apparatus so devised that dirt particles contained in the oil will clog an opening and thereby develop a measurable pressure in responsive portions of the apparatus.

The invention among other things includes a novel valve and throat structure which although acting as an effective screen or barrier for gathering the dirt particles, is devised to be effectually cleared of such particles after the test has been made. In one embodiment of the invention the tested oil may be visually inspected through a sight glass which forms part of the gauging instrumentality of the device, while in the remaining embodiment a direct reading is obtainable through a more simple structure embodying similar operating principles. Other inventive features will be pointed out in the following description and the appended claims.

In the drawings:

Fig. 1 is a side elevation of a dirt indicator forming the first illustrated embodiment of the invention;

Fig. 2 is a partial longitudinal section on an enlarged scale through the lower portion of the indicator of Fig. 1;

Fig. 3 is a section, further enlarged, of the valve and throat structure;

Fig. 4 is a plan view of the pressure gauge of Fig. 1;

Fig. 5 is a longitudinal central cross section through a dirt indicator forming another embodiment of the invention;

Fig. 6 is an enlarged section on the line 6—6 of Fig. 5; and

Fig. 7 is a plan view of the pressure gauge of Fig. 5.

In accordance with the embodiment of the invention shown in Figs. 1 to 4, a dirt indicating instrument is provided which includes a means for visually inspecting the test sample of oil.

The instrument includes a pump for withdrawing a quantity of oil from a crankcase and into the device for the subsequent testing operation. The pump comprises a tubular housing 10 secured at one end to a mounting body 11 and closed at its opposite end by a gland nut 12. A piston 13 formed of opposed cup leathers 14 is mounted within the chamber of the housing 10 and it is secured to one end of a piston rod 15 by nuts 16 and 17. The opposite end of the rod 15 projects through the nut 12 and an operating handle 18 is secured thereto.

The manual operation of drawing oil into the pump by the upward movement of the piston is accompanied by the compression of a spring 21 which is mounted between the piston 13 and the gland nut 12. This prepares the device for a subsequent spring operated discharge stroke of the piston, and latch means are provided for retaining the piston in its withdrawn or upper position for release at the option of the operator. The latch 22 is secured in a slot 23, formed in the nut 12, by a pin 24 and it is formed with a tooth 25 which is engageable with a shoulder 27 on the rod 15. A leaf spring 26 retains the tooth 25 in engagement with the rod 15.

The lower end of the mounting body 11 is tapped to receive a hollow nut 28 into which is secured a filling tube 29 which is used to dip into the liquid to be tested to provide an input for the pump. If the instrument is used as a testing device for the lubricating oil of an automobile, then the tube 29 should be made sufficiently long to reach through the breather opening and to the bottom of the crankcase. The lower end of the tube is formed with a number of radially disposed holes 31, and it carries a plug or valve actuator 32 which projects therefrom and is secured to a wire 33 which extends to a valve mechanism in the body 11, as hereinafter described.

It is proposed to throttle the discharge of the oil from the pump on its spring actuated discharge stroke and to utilize the discharged oil to register a pressure on a suitable instrumentality. This throttle or barrier comprises a seat member 35 pressed into the body 11 and formed with a conical central conduit or opening 36 having an axial circular throat 37 at its smallest diameter. A valve body 30 is slidably mounted in a drilled hole in the body 11 and it is formed at its upper extremity with a valve head 38 which normally is positioned within the circular throat 37 with very small clearance (Fig. 3). The body is formed with a neck 39 immediately below the head 38 and a conical terminal portion 41 extending from the head 38. The lower end of the valve body 30 is formed with a flange 43 and an underlying tapered terminal forming a second valve 44.

The lower end of the body 11 is counterbored to form an opening 40 for receiving the described lower end of the valve body 30. This opening is closed by a valve plug 48 having a seat 46 for receiving the valve 44. Referring to Fig. 2, it will be observed that with the valve 44 in seated position, the valve head 38 assumes the described blocking position in the throat 37. A spring 45 engaged between the flange 43 of the valve body 30 and the inner end of the opening 40 in the body 11, retains the valve and head in the described positions, from which positions they are movable by actuation of the plug 32 and wire 33, which is secured to the valve as indicated by the numeral 50. Communication is established between the valve seat member 35 and the opening 40 in the body 11 by a spider structure comprising a pair of drilled holes 47. It will thus be seen that the valve body 30 and associated parts constitute in effect a check valve for the throat 37, permitting free passage of fluid in one direction, but restricting flow in an opposite direction.

The previously mentioned pressure responsive instrumentality is connected to the chamber 40 through a valve 49, one end of which is screwed into the body 11, as indicated by the numeral 51, and the opposite end is provided with a fitting 52 which is secured to a head 53. A second head 54 is spaced from the head 53 by a tubular air chamber or sight glass 55, and gaskets 56 are interposed therebetween to provide liquid-tight joints. These parts are retained in assembled relation by a rod 57 which is threaded into the head 53 and which projects upward through a large hole 58 in the upper head 54. An internally threaded shouldered nut 59 is rotatably mounted in the hole 58 and it engages the upper threaded end of the rod 57 and thus clamps the heads to the glass 55. A number of bars 61 are mounted between the heads exterior of the glass 55 to protect the same from accidental blows.

A gauge 63, which may be of the Bourdon type, is secured to the nut 59 and it communicates with the interior of the glass 55 through holes 64, 65, drilled in the rod 57. The glass 55 also communicates with the valve 49 through holes 66 in the lower head 53 which lead into the fitting 52.

In operation, when it is desired to obtain and test an oil sample from a crankcase, the valve 49 is closed as shown in Fig. 2, and the tube 13 is then inserted in the crankcase against a wall thereof to depress the valve plug 32 and thus open the valves 38 and 44. The piston is then moved from its lower position to a position where the latch 22 engages the rod shoulder 27, thus drawing an oil sample into the housing 10. Upon withdrawing the tube from the crankcase, the valve 44 closes under the pressure of the small spring 45 and the oil sample is effectually trapped.

In testing the sample, the valve 49 is opened to establish communication between the chamber 40 and the glass 55, and the latch 22 is then released. The piston immediately responds to the pressure of the compressed spring 21 and forces the oil through the clearance area between the valve head 38 and the throat 37, and thence through holes 47, valve 49, fitting 52 and into the glass 55. The oil, thus entering the glass 55, compresses the air therein, and the degree of compression is immediately registered on the gauge 63.

It will be observed that when the tested sample is substantially free of foreign particles, all of the oil will be forced past the barrier, and accordingly, the gauge 63 will register the highest pressure. In Fig. 1 the piston is shown in blocked position after a major portion of oil has been expelled from the housing 10. The blocking is accomplished by the accumulation of foreign particles above a predetermined minimum size in the clearance space between the valve head 38 and the throat 37, and in this instance the pressure has caused the rotation of the gauge hand on the calibrated dial 70 (Fig. 4) to a position indicating a slight pollution of the oil. In the testing of a very dirty oil, the particles will almost immediately block the barrier, and as a result little or no pressure will be transmitted to the air column in the glass 55. The gauge 63, therefore, will remain unaffected, with its hand in the starting position on the dial portion marked "dirty".

In clearing the instrument for a subsequent test, the valves 38 and 44 are again opened by depressing the plug, and the piston is withdrawn to draw the oil from the glass 55. The valve 49 is then closed and the oil is expelled from the device through the tube 13. During this process the barrier is effectually cleansed of all particles by the rush of oil through the throat 37.

It will be appreciated that where only an approximate test is required, the gauge 63 may be dispensed with by suitably calibrating the glass 55. In the described device, the sight glass is primarily utilized to permit visual inspection of the oil sample.

In the second embodiment of the invention (Figs. 5 to 7) an instrument is provided having the same general pump, piston, and tube and valve actuator structures. The specific mounting body, valve and gauge disposal will be found to be different, as hereinafter described.

The mounting body 71 of this embodiment receives a seat member 72 formed with a conical opening 73 having a sharp circular throat 74 at its smallest diameter. A hole 75 extends through the member 72 above the throat 74, and it communicates with a tapped hole 76 which receives a pressure gauge 77.

Below the seat member 72, the mounting body is drilled axially to receive a valve body 78, the enlarged head 79 of which is disposed within the throat 74, and when in such position it rests on a shoulder 81 in the body 71. The opposite end of the valve body projects into an opening 82 formed in the body 71, and its terminal portion is threaded to receive a nut 83. The valve is normally retained in the described position by a spring 84 which is retained between the nut 83 and the wall of the chamber 82. The valve may be raised, however, by the actuation of the plug 32a and wire 33a which is secured thereto, and in such moved position, the head 79 is raised above the throat 74 to afford a clear oil passage.

The operation of the last described embodiment of the invention is similar to that of the first embodiment in respect to obtaining the oil sample and the subsequent release of the latch 22a thereof to permit the spring actuated piston 13a to force oil through the clearance space or orifice between the head 79 and the throat 74. The oil escaping through this space, however, is vented directly through the tube 29a, and, when the orifice is clogged to offer a greater resistance to the outward flow of oil, there is created a measurable pressure on the body of oil in the housing 10a, which pressure is reflected on the gauge 77 with a resulting substantial deflection of the gauge needle 80 from the starting position shown in Fig. 7. If, however, the total amount of dirt or the size of the particles is not enough to clog the orifice to this extent, the needle 80 will only be deflected over that portion of the gauge scale which represents a clean oil, or one sufficiently clean for all practical purposes.

It will also be observed that after the test has been performed, the plug 32a may be pushed upward to increase the size of the head and throat orifice, and the residual amount of oil in the instrument will then rush freely past the throat 74 and simultaneously wash it free of any dirt which may have accumulated thereon.

It will be understood that I do not claim as my invention broadly the provision of apparatus for testing the cleanliness of oils, but I do claim apparatus so designed as to permit of the sampling of the oil and the cleaning of the testing opening or orifice in a simple manner, as contemplated by the principles above discussed.

It will further be apparent that the invention may be applied in forms or types of apparatus differing in structure, appearance or arrangement from those herein illustrated, and it is therefore intended that the invention shall be limited only by the scope of the following claims.

I claim:

1. In a dirt indicator, the combination with a means for supplying fluid under pressure, of a conduit communicating with said means and having a throat therein, a check valve mounted in the throat to obstruct the flow of fluid under pressure therethrough and having a constant peripheral clearance with the wall of said conduit throat to entrap foreign particles, whereby said particles may block said throat, and means for gauging the resistance to fluid passage through the throat.

2. In a dirt indicator, the combination with a liquid receiving chamber and means for applying pressure to the chamber, of a conduit communicating with said chamber and having a throat therein, a check valve mounted in the throat to obstruct the flow of liquid under pressure therethrough and having a constant clearance with the wall of said throat to entrap foreign particles, whereby the particles may block said throat, means connected to said conduit for gauging the resistance of fluid passage through the throat, and means for moving said valve from its obstructing position in the throat to permit free flow of fluid therethrough.

3. In a dirt indicator, a chamber, a piston therein, a conduit communicating with said chamber and having a throat therein, a movable valve mounted in the throat, said valve in closed position having constant clearance with the wall of said conduit throat to entrap foreign particles above a predetermined size, a spring in the chamber engaging the piston and adapted to move the piston toward the conduit to discharge liquid through the throat and past said valve in closed position, and a pressure gauge communicating with said conduit.

4. In a dirt indicator, a chamber, a piston therein, a conduit communicating with said chamber and having a throat therein, a movable valve mounted in the throat, said valve in closed position having constant clearance with the wall of the conduit throat to entrap foreign particles above a predetermined size, a spring in the chamber engaging the piston and adapted to move the piston toward the conduit to discharge oil through the throat and past said valve in closed position, a pressure gauge communicating with said conduit, and means exterior of the conduit having a connection with the valve and adapted to be manually operated to move the valve from its obstructing position in the throat to permit clearing of the throat of foreign particles by liquid flow.

5. In a dirt indicator, the combination with a liquid receiving chamber and means for applying pressure to the chamber, of a conduit communicating with the chamber and having a throat therein, a valve mounted in the throat and having a uniform peripheral clearance with the wall of the throat to entrap foreign particles above a predetermined size whereby the particles may block said throat, a discharge tube connected to the conduit, a wire secured to the valve and extending through the tube, a plunger secured to the wire at the end of the tube and being manually operable to move the valve from its obstructing position in the throat to permit clearing of the throat of foreign particles by liquid flow, and a pressure gauge communicating with said conduit.

6. Apparatus for testing the dirt content of liquid comprising a chamber adapted to receive liquid to be tested, said chamber being formed at one end with an orifice of reduced size, a spider member adjacent said orifice formed with open passages, a valve member mounted on said spider to partially close said orifice, a spring for holding the valve member on the spider, and a rod connected to said valve member and extending beyond said chamber for manipulating said valve to increase said orifice.

7. Apparatus for testing the dirt content of liquid, comprising a cylinder, a piston in said cylinder, a piston rod connected to the piston and extending beyond one end thereof, a spring disposed between the said end of the cylinder and the piston whereby the piston is normally urged toward the opposite end of the cylinder, a conduit formed at said opposite end, a movable loosely fitting valve disposed in the conduit, a spring for holding said valve in place, said valve when so held providing a restricted passage into said cylinder, a supply tube connected to the lower end of the cylinder and communicating with said passage, a plunger rod in said tube connected to said valve, whereby the extent of restriction may be varied at will, and pressure responsive means for indicating the clogging of said passage by dirt particles contained in liquid flowing therethrough.

8. In a dirt indicator, a chamber, a piston therein, a closed sight glass, a conduit connecting the chamber to the sight glass, said conduit having a throat therein, a movable valve mounted in the throat, said valve in closed position having constant clearance with the throat to entrap foreign particles above a predetermined size, and a spring in the chamber engaging the piston and adapted to move the piston toward the conduit to discharge liquid through the throat and into said sight glass.

9. In a dirt indicator, a chamber, a piston therein, a closed sight glass, a conduit connecting the chamber to the sight glass, said conduit having a throat therein, a movable valve mounted in the throat, said valve in closed position having clearance with the throat to entrap foreign particles above a predetermined size, means for moving the piston toward the conduit to discharge liquid through the throat, a filling tube communicating with the conduit between the throat and sight glass, and a second valve connected to the first valve and adapted to close said tube when the first valve is in closed position.

10. In a dirt indicator, a chamber, a piston therein, a closed sight glass, a conduit connecting the chamber to the sight glass, said conduit having a throat therein, a movable valve mounted in the throat, said valve in closed position having clearance with the throat to entrap foreign particles above a predetermined size, means for moving the piston toward the conduit to discharge liquid through the throat, a filling tube communicating with the conduit between the throat and sight glass, a second valve connected to the first valve and adapted to close said tube when the first valve is in closed position, a manually operable wire in said tube extending from the exterior of the tube and connected to said second valve, said wire being operable to open said valves simultaneously, and a third valve for closing communication between said sight glass and said conduit.

11. In a dirt indicator, the combination with means for supplying fluid under pressure, of a conduit communicating with said means and having a throat therein, a check valve having a relatively narrow cylindrical head portion disposed in the throat with slight annular clearance and a conical extremity extending toward said supply means, the clearance between the valve head and throat being such as to entrap foreign particles above a predetermined size whereby the particles may block said throat, and gauge means responsive to the resistance of fluid passage through the throat.

EDWIN A. PIEL.